(12) United States Patent
Zhao et al.

(10) Patent No.: US 7,627,100 B2
(45) Date of Patent: Dec. 1, 2009

(54) METHOD FOR PROVIDING VIRTUAL PRIVATE NETWORK SERVICES

(75) Inventors: Xiaodong Zhao, Shenzhen (CN); Junrong Xu, Shenzhen (CN); Jie He, Shenzhen (CN); Jianjun Ding, Shenzhen (CN); Haifeng Xu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 63 days.

(21) Appl. No.: 10/568,567

(22) PCT Filed: Aug. 13, 2004

(86) PCT No.: PCT/CN2004/000941

§ 371 (c)(1),
(2), (4) Date: Oct. 23, 2006

(87) PCT Pub. No.: WO2005/041476

PCT Pub. Date: May 6, 2005

(65) Prior Publication Data

US 2007/0206744 A1    Sep. 6, 2007

(30) Foreign Application Priority Data

Aug. 15, 2003   (CN) .............................. 03 1 53613

(51) Int. Cl.
*H04M 15/00*    (2006.01)
(52) U.S. Cl. .............................. 379/114.2; 379/114.28; 379/114.17
(58) Field of Classification Search ............. 379/114.01, 379/114.03, 114.15, 114.17, 114.2, 114.28, 379/144.01; 455/406; 726/4, 7, 15, 17, 21
See application file for complete search history.

(56) References Cited

U.S. PATENT DOCUMENTS 5,749,075 A * 5/1998 Toader et al. ................. 705/14
6,266,699 B1   7/2001 Sevcik (Continued)

FOREIGN PATENT DOCUMENTS

EP    1 185 064 A2    3/2002

(Continued)

OTHER PUBLICATIONS

European Search Report dated Mar. 28, 2007, for EP 04762077.8, in the name of Huawei Technologies Co., Ltd.

(Continued)

*Primary Examiner*—Quoc D Tran
(74) *Attorney, Agent, or Firm*—Leydig, Voit & Mayer, Ltd.

(57) ABSTRACT

The present invention discloses a method for providing a Virtual Private Network (VPN) service. The method comprises the steps of: after receiving a call request from a user terminal, a Service Control Point (SCP) judging whether the user terminal has applied for a prepaid service at the same time, if so, initiating a VPN service logic, invoking a prepaid service logic by the VPN service logic, and deducting fee from a prepaid account corresponding to the user terminal while providing the VPN service to the user terminal. With the present invention, a VPN service can be provided for a prepaid service user, which not only brings convenience for prepaid service users, but also prompts expansion of VPN service, thus bringing great interests for the operators.

11 Claims, 1 Drawing Sheet

U.S. PATENT DOCUMENTS

| | | | |
|---|---|---|---|
| 6,748,067 B2 * | 6/2004 | Malik | 379/114.2 |
| 2002/0150079 A1 | 10/2002 | Zabawskyj et al. | |
| 2003/0140131 A1 * | 7/2003 | Chandrashekhar et al. | 709/223 |
| 2004/0076281 A1 * | 4/2004 | Dahari | 379/229 |

FOREIGN PATENT DOCUMENTS

| | | |
|---|---|---|
| EP | 1 263 243 A2 | 12/2002 |
| EP | 1655887 A1 * | 5/2006 |
| JP | 8-251288 | 9/1996 |
| JP | 2001-53879 | 2/2001 |
| JP | 2001-086271 A | 3/2001 |
| JP | 2001-119502 A | 4/2001 |
| JP | 2002-41991 | 2/2002 |
| KR | 2001-0079167 | 8/2001 |
| KR | 10-2003-0054159 | 7/2003 |
| WO | WO 02/101624 A1 | 12/2002 |
| WO | WO 03/032657 A1 | 4/2003 |

OTHER PUBLICATIONS

Patent Abstracts of Japan, Publication No. 08-251288, dated Sep. 27, 1996, in the name of Hiroshi Ito et al.
Patent Abstracts of Japan, Publication No. 2001-053879, dated Feb. 23, 2001, in the name of Fa Shiyan et al.
Japan Office action dated Oct. 23, 2007, for JP 2006-523509, with brief English translation.
Patent Abstracts of Japan, Publication No. 2002-041991, dated Feb. 8, 2002, in the name of Miyanouchi Makoto.
Korean Patent Abstracts, Publication No. 1020010079167 A, dated Aug. 22, 2001, in the name of Gyu Cheon Kim.
Korean Patent Abstracts, Publication No. 1020030054159 A, dated Jul. 2, 2003, in the name of U Hyeong Choi et al.
Korean Office action, dated Feb. 26, 2007, for corresponding Korean application.
International Search Report dated Dec. 9, 2004 corresponding to PCT/CN2004/000941.

* cited by examiner

METHOD FOR PROVIDING VIRTUAL PRIVATE NETWORK SERVICES

FIELD OF THE TECHNOLOGY

The present invention relates to intelligent network service, more particularly to a method for providing Virtual Private Network (VPN) services.

BACKGROUND OF THE INVENTION

A VPN is a kind of network disposed in a public network infrastructure. The whole VPN network is a logic network constructed upon a network platform provided by a public network service provider, and there is no end-to-end physical link as required in a traditional private network between any nodes of the VPV network. User data are transmitted through logic links. A VPN service is a kind of intelligent network services. Its main object is to define telephone users of a company or a team as one group, and allocate each user within this group with a short number which can be used inside the group, and users within this group can directly call one another by dialing the short number.

To resolve the problem of user's malicious overdrawing, it is feasible to adopt prepaid services. A prepaid service is an important service provided by an intelligent network. A prepaid user needs to deposit a certain amount of fee in his prepaid account before calling and communication fee will be deducted from the corresponding account real-timely. If the fee in the account is used up, a current call will be terminated and the corresponding user terminal cannot initiate a call until this account is recharged.

SUMMARY OF THE INVENTION

The present invention relates to a method for providing a VPN service according to the present invention which comprises the steps of:

A. receiving a call request for a VPN service from a user terminal, initiating a VPN service logic, and determining whether the user terminal has customized a prepaid service by an SCP;

B. providing, by the VPN service logic, the VPN service to the user terminal, charging the VPN service, and invoking a prepaid service logic for deducting, according to a result of the charging from a prepaid account.

In the method, the method further includes the process of: before initiating the VPN service logic, implementing a VPN service authentication for the user terminal, if the user terminal passes the VPN service authentication, executing the initiating of the VPN service logic.

The step of A is followed by a further step of implementing prepaid service authentication for the user terminal, if the user terminal passes the prepaid service authentication, executing step B, otherwise returning a prepaid service authentication failure message to the user terminal.

Wherein the step of implementing prepaid service authentication for the user terminal is followed by a further step of presetting an authentication interface for the prepaid service, wherein the step of implementing the prepaid service authentication for the user terminal is implemented by invoking the authentication interface set for the prepaid service.

Wherein the step of implementing the prepaid service authentication for the user terminal comprises: judging whether the user terminal's corresponding prepaid account is valid and judging whether there is sufficient balance in the prepaid account.

Preferably, the method further comprises the step of presetting a fee-applying interface for the prepaid service, before providing the VPN service for the user terminal.

Wherein the step of B comprises:

the VPN service logic invoking the fee-applying interface, the prepaid service logic applying for fees and notifying the VPN service logic of a fee application result; and the VPN service logic judging whether the fee is obtained according to the fee application result, if so, providing the VPN service for the user terminal according to the fee application result.

Preferably, the method further comprises the step of presetting a fee-deducting interface for the prepaid service.

Wherein the deducting operation in step B comprises:

the VPN service logic invoking the fee-deducting interface and sending a fee-deducting request to the prepaid service logic, the prepaid service logic deducting the result of the charging from the applied fee after receiving the request.

Preferably, the method further comprises the step of presetting a fee-returning interface for the prepaid service.

In the method, after the deducting operation in step B, the method further includes the process of: the VPN service logic judging whether there is remaining fee in the applied fee, if so, invoking the fee-returning interface and returning the remaining fee to the prepaid account corresponding to the user terminal.

It can be seen from the technique scheme of the present invention, after receiving a VPN service request, a SCP continues to judge whether the user terminal has applied for a prepaid service. If the user terminal applying for VPN service has applied for prepaid service, the VPN service logic will invoke prepaid service logic by invoking the preset prepaid service interface so that prepaid service users can also utilize VPN services. In this way, a prepaid service user can use other intelligent services of an intelligent network. Therefore, not only prepaid users are facilitated, but also a problem which long-harasses operators is resolved, so that the operators can popularize VPN service among numerous prepaid service users with great economic interests for the operators.

DETAILED DESCRIPTION OF THE INVENTION

Figure 1:
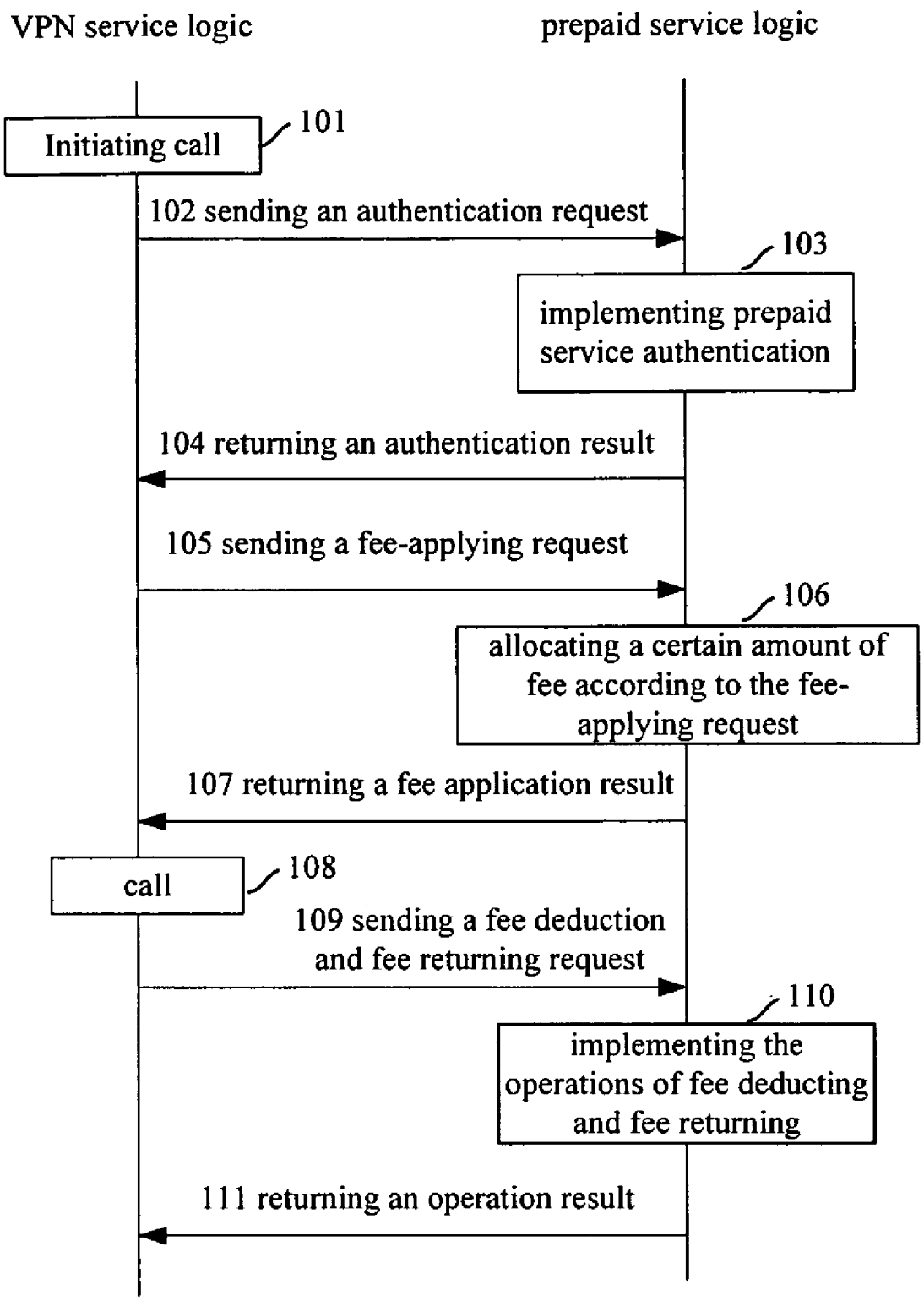
FIG. 1 is a flowchart illustrating a VPN service according to an embodiment of the present invention.

To make the object, technique scheme and advantages of the present invention clear, the present invention will be described in detail hereinafter with reference to accompanying drawings and embodiments.

The key idea of an embodiment of the present invention is: a user terminal with functions of both a VPN service and a prepaid service sends a call request for a VPN service to a SCP; after receiving this request, the SCP implements VPN service authentication for this user terminal at first. If the VPN service authentication passed, the SCP continues to implement prepaid service authentication for this user terminal, such as determining whether there is available fee in the prepaid account corresponding to the user terminal. If there is available fee in the corresponding prepaid account, the user terminal is allowed to implement a call and communication fee will be deducted from the prepaid account corresponding to the user terminal.

To realize the above-mentioned key idea, priority of VPN service is set higher than that of prepaid service in the embodiment of the present invention, thereby when a user terminal applying for both VPN and prepaid intelligent services starts a call, the VPN service with higher priority is firstly initiated and then the prepaid service is initiated through service invoking. Similar to function invoking, service invoking is to define various independent functions as invoking interfaces which are similar to functions in a prepaid service and to publicize these interfaces for other services to invoke. Certainly, various function interfaces set in a prepaid service can be extended on need of other services upon the prepaid service. With these function invoking interfaces, other services to be prepaid will invoke these relevant interfaces to utilize various functions of a prepaid service. Because each service in an intelligent network is fulfilled through corresponding service logic, the service logic used to implement VPN service is called VPN service logic and the service logic used to implement prepaid service is called prepaid service logic.

In order to realize invoking for prepaid services, relevant function invoking interfaces of a prepaid service is defined, the interface including: authentication interface, fee-applying interface, fee-deducting interface and fee-returning interface. Utilization of prepaid service by other services generally requires using fee in the prepaid account, but according to service characteristic of a prepaid service, authentication is necessary before fee in the prepaid account is used, thus an authentication interface is defined. At present, authentication processing mainly includes determining prepaid account balance, valid period of a prepaid user, minimum threshold of a prepaid user account, whether the user reports a loss, whether the user is blocked, etc. As the fee in a prepaid account is for multiple utilities, the user must apply to use the fee in the prepaid account and cannot use the service before acquiring the applied fee, thus a fee-applying interface is defined in order to transmit information when a user applies for fees. After the fee in the prepaid account is used for VPN service, to guarantee accuracy of the fee in the prepaid account, relevant fee should be deducted from the prepaid user's account real-timely, thus a fee deducting interface is defined to notify interface parameters used in deduction by prepaid service. After the user finishes VPN service, the remaining fee must be returned to the prepaid account if there is any in the applied prepaid service account, so as to guarantee the accuracy of fee in the prepaid account, thus a fee-returning interface is defined in the embodiment of the present invention.

After defining the above interfaces, with reference to FIG. 1, a specific procedure of providing a VPN service for a prepaid service user according to the embodiment of the present invention is as follows:

Steps 101~102: a user terminal sends a call request to a SCP, requesting for a VPN service. The SCP implements authentication for this user terminal after receiving the call request and judges whether this user terminal has signed a contract for VPN service according to this user terminal's contract information. If so, the SCP will initiate a VPN service logic. Then, the SCP further judges whether the user terminal has signed a contract for prepaid service according to the user terminal's contract information, if so, a VPN service logic will invoke authentication interface of the prepaid service to send an authentication request to the prepaid service logic, and then step 103 will be executed. If the user terminal has a contract for VPN service but has not a contract for prepaid service, the user terminal will be provided with traditional VPN service; if the user terminal has no contract for VPN service, the VPN service is failed and current call is ended.

Steps 103~104: after receiving an authentication request from a VPN service logic, the prepaid service logic implements authentication for this user terminal and notifies the VPN service logic of the authentication result. Here, the processing of prepaid service authentication mainly includes judging whether the corresponding prepaid account of the user terminal is valid and whether there is sufficient balance in the account.

Steps 105~107: after receiving the prepaid service authentication result, the VPN service judges whether the user terminal passes the prepaid service authentication according to the authentication result, if so, the VPN service invokes a fee-applying interface and sends a fee application request to the prepaid service logic, otherwise, the VPN service is failed and the current call flow is ended. After receiving this fee application request, the prepaid service logic judges whether there is sufficient fee in the user terminal's corresponding prepaid account, if so, allocates a certain amount of fee for this user terminal, namely freezing the certain amount of fee in the account and rejecting other services to utilize this part of fee, and then notifies the VPN service logic of fee application result. Otherwise, the prepaid service logic notifies the VPN service logic of the fee application result that no fee is applied. After receiving the fee application result, the VPN service logic judges whether the fee is obtained according to the fee application result, if so, continues to execute subsequent steps, otherwise ends the current flow directly. Here, this user terminal's corresponding prepaid account may provide prepaid services of multiple intelligent services simultaneously, so judging of whether there is available fee is to judge whether there is available fee in this user terminal's corresponding prepaid account to be provided for the VPN service.

Steps 108~111: after receiving the notification of obtaining fee for the VPN service, the VPN service logic starts a call, monitors the call and calculates the fee of current call when the call is over, and invokes fee-deducting interface of the prepaid service to deduct fee from the prepaid account. If the deducted fee is less than applied fee, namely there is still remainder in the applied fee, the VPN service logic will continue to invoke fee-returning interface and return the remaining fee to the corresponding prepaid account, which means to defreeze the frozen remaining fee so that other services can utilize this part of fee. And then the prepaid service logic is notified that processing is over. Certainly, if there is no fee remained, such step as returning fee can be omitted.

It can be seen from the embodiment of the present invention mentioned above, a user can sign a VPN service and a prepaid service in a SCP at the same time. When a user sends a call request, the SCP initiates a VPN service logic. And during the processing of a VPN service, the VPN service logic triggers a prepaid service logic, so that a prepaid service user is capable of enjoying a VPN service.

The method of the embodiment of the present invention can be applied in various intelligent networks, such as CDMA-based intelligent network or GSM-based intelligent network.

While the invention has been shown and described with reference to a preferred embodiment thereof, it will be understood by those skilled in the art that various changes, equal substitution and improvement in form and details may be made therein without departing from the spirit and scope of the invention as defined by the appended claims.

The invention claimed is:

1. A method for providing a Virtual Private Network (VPN) service, comprising the steps of:

A. receiving a call request for a VPN service from a user terminal, initiating a VPN service logic, and determining whether the user terminal has customized a prepaid service by a Service Control Point (SCP);

B. invoking a fee-applying interface preset in a prepaid service logic for applying fees, providing, by the VPN service logic, the VPN service to the user terminal, charging the VPN service, and invoking a fee-deducting interface preset in the prepaid service logic for deducting, according to a result of the charging, from a prepaid account.

2. The method according to claim 1, further comprising:

before initiating the VPN service logic, implementing a VPN service authentication for the user terminal, if the user terminal passes the VPN service authentication, executing the initiating of the VPN service logic.

3. The method according to claim 1, wherein the step of A is followed by a further step of implementing prepaid service authentication for the user terminal, if the user terminal passes the prepaid service authentication, executing step B, otherwise returning a prepaid service authentication failure message to the user terminal.

4. The method according to claim 1, wherein the step of implementing prepaid service authentication for the user terminal is followed by a further step of presetting an authentication interface for the prepaid service, wherein implementing the prepaid service authentication for the user terminal is implemented by invoking the authentication interface set for the prepaid service.

5. The method according to claim 1 wherein the step of implementing the prepaid service authentication for the user terminal comprises: judging whether the user terminal's corresponding prepaid account is valid and judging whether there is sufficient balance in the prepaid account.

6. The method according to claim 1, further comprising the step of presetting a fee-applying interface for the prepaid service, before providing the VPN service for the user terminal.

7. The method according to claim 1, wherein the step of B comprises:

the VPN service logic invoking the fee-applying interface, the prepaid service logic applying for fees and notifying the VPN service logic of a fee application result; and the VPN service logic judging whether the fee is obtained according to the fee application result, if so, providing the VPN service for the user terminal according to the fee application result.

8. The method according to claim 1, further comprising the step of presetting a fee-deducting interface for the prepaid service.

9. The method according to claim 1, wherein the deducting operation in step B comprises:

the VPN service logic invoking the fee-deducting interface and sending a fee-deducting request to the prepaid service logic, the prepaid service logic deducting the result of the charging from the applied fee after receiving the request.

10. The method according to claim 1, further comprising the step of presetting a fee-returning interface for the prepaid service.

11. The method according to claim 1, after the deducting operation in step B, the method further comprising: the VPN service logic judging whether there is remaining fee in the applied fee, if so, invoking the fee-returning interface and returning the remaining fee to the prepaid account corresponding to the user terminal.

* * * * *

UNITED STATES PATENT AND TRADEMARK OFFICE
CERTIFICATE OF CORRECTION

| | |
|---|---|
| PATENT NO. | : 7,627,100 B2 |
| APPLICATION NO. | : 10/568567 |
| DATED | : December 1, 2009 |
| INVENTOR(S) | : Zhao et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 86 days.

Signed and Sealed this

Second Day of November, 2010

David J. Kappos
*Director of the United States Patent and Trademark Office*